Patented Nov. 6, 1951

2,573,743

UNITED STATES PATENT OFFICE 2,573,743

METHOD OF MANUFACTURING COLLOIDAL INORGANIC OXIDE AQUASOLS

Henry S. Trail, Quincy, Mass., assignor to Monsanto Chemical Company, St. Louis, Mo., a corporation of Delaware No Drawing. Application July 31, 1948, Serial No. 41,892

10 Claims. (Cl. 252—313)

The present invention relates to improvements in the preparation of inorganic oxide aquasols, and it more particularly relates to improvements in the manufacture of concentrated silica aquasols.

It has been proposed heretofore to prepare silica aquasols by passing a dilute aqueous sodium silicate solution comprising about 3% $SiO_2$ through ion-exchange zeolites which have been prepared by treating a carbonaceous material such as brown coal and the like with concentrated sulfuric acid. The silica aquasol which is obtained as the effluent from the zeolite comprises about 3% silica and is too dilute to be commercially useful as produced. Attempts to prepare more highly concentrated silica aquasols directly by use of ion exchange materials have not been successful heretofore because of gel formation in the ion-exchange bed when a more highly concentrated solution of sodium silicate is employed. It has been necessary, therefore, to concentrate the dilute silica aquasols prepared by the above method by evaporating large quantities of water therefrom in order to obtain a commercially useful aquasol comprising 15% or more colloidal silica. However, this method of concentrating the initial silica aquasol obtained from the ion-exchange treatment of sodium silicate is quite inefficient. Moreover, by using such a method great care must be taken to avoid scale formation on heat exchange surfaces during the concentrating step.

The present invention not only provides a simple and efficient method of producing a highly concentrated silica aquasol by the use of cation-exchange materials, but also provides a silica aquasol which comprises colloidal silica having a relatively large particle size. The silica aquasol produced by the method described herein is particularly useful when applied to cotton and wool fibers prior to spinning since it increases the strength of the spun yarn and facilitates the spinning of finer yarns than are ordinarily obtainable by spinning untreated yarns.

One object of the present invention is the preparation of inorganic oxide aquasols from inorganic oxide compounds with the aid of cation-exchange materials by an improved and efficient process.

A further object of the present invention is the preparation of concentrated silica aquasols from alkali metal silicates with the aid of cation-exchange materials by a substantially continuous method.

A further object of the present invention is the preparation of silica aquasols having colloidal silica particles of substantially larger size than those normally obtained by the use of cation-exchange methods.

Still further objects and advantages of the present invention will appear from the following description and the appended claims.

For convenience in description the present invention is described with reference to the preparation of silica aquasols. However, it is to be understood that the method and principles described hereinafter may also be applied to the preparation of aqueous colloidal solutions of tungstic acid, vanadium oxide, molybdenum trioxide and other inorganic oxides as will be apparent to those skilled in the art.

Of primary importance in the practice of the present invention is the instant discovery that alkaline reacting silica aquasols comprising up to 30% by weight or more of colloidal silica together with a small proportion of "ionic silica," say about from 1 to 4% by weight based on the total water present in the mixture can be passed through a bed of cation-exchange material or resin without appreciable gel formation either in the exchange bed or in the effluent issuing therefrom. The principal limiting factor on the concentration of the silica aquasol which can be passed through an exchange bed in this manner is the viscosity of the aquasol. In addition, it has presently been found that when the effluent from the above mixture is alkalized or made alkaline reacting with a small proportion of an alkaline or basic compound capable of ionizing to form alkali metal, ammonium or quaternary ammonium ions and the alkalized effluent is then heat treated at a temperature essentially above 100° C. for a period of time sufficient to convert the ionic silica contained therein to colloidal silica, an additional small proportion of ionic silica can be added thereto and passed through a bed of fresh or acid regenerated cation-exchange material without any appreciable gel formation in the exchange bed. By application of the foregoing principles concentrated colloidal silica aquasols are continuously prepared as hereinafter described by the use of ion-exchange materials.

The term "ionic silica" as employed herein is intended to mean silica which is chemically combined with an alkali metal such as sodium, but is capable of being ionized in aqueous solution or silica which has an average particle size below about 40 mu as determined by super-centrifuging techniques. The latter type of silica does not settle out of solution when the solution is supercentrifuged at a centrifugal force equivalent to 62,000 times the force of gravity.

As examples of alkaline or basic compounds which are employed to alkalize the effluent in the manner described above may be mentioned ammonia, ammonium hydroxide, sodium hydroxide, sodium silicate, potassium silicate, benzyl triethyl ammonium hydroxide, tetramethyl ammonium hydroxide and the like. Of these ammonia, ammonium hydroxide and the alkali metal silicates are preferred.

When the above described principles are employed in carrying out the present invention, concentrated silica aquasols containing up to 30% or more colloidal silica can be prepared from silica aquasols containing only about 3% by weight of colloidal silica by continuously recycling the alkalized and heat treated effluent through a cation-exchange bed together with a small proportion of ionic silica. Likewise, the same process can be carried out by starting with an aqueous solution of ionic silica such as sodium silicate, containing up to 4% of ionic silica. On the other hand, the process or method described herein can be initiated by passing a concentrated colloidal silica aquasol together with a small proportion of ionic silica through a cation exchange bed and a small proportion of silica aquasol can be withdrawn from the effluent either prior to or after the heat treatment of the effluent and the balance of the effluent after it has been alkalized and heat treated can be recycled through the exchange bed together with another small proportion of ionic silica. Such concentrated colloidal silica aquasols may be prepared, for example, by recycling a dilute silica aquasol as described above the build up the concentration of silica therein, or by evaporating water from a dilute silica aquasol prepared by passing a sodium silicate solution through a bed of cation-exchange material and then alkalizing and heat treating the concentrated silica aquasol to convert the particles therein to the colloidal silica form. When operating according to the latter procedure a silica aquasol having a substantially constant colloidal silica content can be prepared continuously and efficiently without the necessity of evaporating large quantities of water. The small portion of effluent withdrawn from the system is then heat treated and thereby rendered stable. The size of the colloidal silica particle in the silica aquasol can be varied as desired depending to a considerable extent upon the conditions under which the heat treatment of the aquasol is effected.

The recycling of effluent through the exchange bed after it has been heat treated and after a small proportion of ionic silica has been added thereto can be carried out almost indefinitely by repeating the above procedure depending to a considerable extent upon the conditions employed during the heat treatment of the effluent. It is during this heat treatment that the ionic silica contained in the effluent issuing from the exchange bed is converted to colloidal silica and the effluent becomes sufficiently stable to be recycled without appreciable gel formation therein. The conversion of ionic silica to colloidal silica is affected primarily by the temperature to which the effluent is heated, the alkalinity of the effluent and the duration of heating. By increasing any or all of these factors, the rate of conversion of ionic silica to colloidal silica is increased. However, these factors of temperature, alkalinity and duration of heating also influence the ultimate particle size of the colloidal silica present in the effluent, and by increasing the temperature, alkalinity or duration of heating extremely large particles of colloidal silica can be formed. Since such particles tend to form a floc or precipitate in the exchange bed, it is preferable to carry out the heat treatment of the effluent under such conditions that the ionic silica particles are converted to colloidal size without the formation of colloidal silica particles of extremely large size. This is accomplished in general by carrying out the heat treatment of the effluent at as low a temperature and with as little alkali metal, ammonium or quaternary ammonium ion as is practicable for the conversion of ionic silica to colloidal silica.

In a preferred embodiment of the invention an alkaline reacting silica aquasol comprising from about 10 to 25% colloidal silica is admixed with an aqueous alkali metal silicate solution preferably an aqueous sodium silicate solution in an amount sufficient to provide up to about 4% and preferably up to 3% by weight of "ionic silica", based on the total quantity of water present in the final mixture. This mixture or feed stock is then run through a bed of cation-exchange material which operates on a hydrogen regeneration cycle until the alkali metal silicate begins to break through the bed without appreciable adsorption of alkali metal ions by the exchange material. At this point the pH of the total effluent is generally slightly below the neutral point, that is, about 6.6 to 6.8. The total quantity of effluent issuing from the exchange bed is generally collected in a suitable storage tank. The effluent is alkalized by adding thereto an amount of alkaline compound sufficient to provide from about 0.05 to 0.2% by weight (based on the total effluent) of alkali metal, ammonium or quaternary ammonium ions, preferably sodium ions derived from sodium silicate. This can be accomplished by the addition to the effluent of feed stock obtained from the exchange bed after the break through point is reached, or the alkaline compound addition can be made separately after the total quantity of effluent from the exchange bed has been collected and is still slightly acidic or has a pH slightly below the neutral point.

The above effluent is heated above about 100° C. for a sufficient period of time to convert the "ionic silica" present therein to the colloidal silica form. In general, temperatures equivalent to gauge steam pressures of from about 60 to 200 pounds per square inch are suitable for carrying out the heat treatment of the effluent although higher or lower temperatures may be employed depending upon the alkalinity of the effluent and the duration of the heat treatment. At the above described steam pressures and alkaline ion concentrations a period of heating of about 10 to 120 minutes has been found to be satisfactory for converting ionic silica to the colloidal form. The short heating period of 10 minutes corresponds to temperatures equivalent to about 200 pounds per square inch gauge steam pressure.

The present invention is preferably practiced by recycling the heat treated effluent after it has been cooled through a bed of fresh or acid regenerated cation-exchange material together with another proportion of aqueous alkali metal silicate solution so as to provide up to about 4% by weight of ionic silica in the manner hereinbefore described. The effluent is then collected and heat treated as described above and the process is repeated as often as desired.

When the foregoing process is operated so as to prepare a silica aquasol having a substantially fixed colloidal silica concentration as, for example, 15%, 18%, 20%, 25% or 30% colloidal silica concentration by weight, a proportion of the effluent substantially equal in weight to the amount of alkali metal silicate solution initially added is withdrawn at some stage of the recycling process and prior to the addition of further quantities of ionic silica. The portion withdrawn after each pass is collected as a marketable product if it has been heat treated as described or can be heat treated separately after it has been alkalized if it is withdrawn from the effluent issuing from the exchange bed.

When inorganic oxide aquasols other than silica aquasols are prepared by a substantially similar process it is generally more difficult to prepare colloidal solutions containing high concentrations of inorganic oxide since sols such as tungstic acid sols, vanadium oxide sols and the like have a relatively short stable life even at low concentrations. However, it is possible to produce such sols in more highly concentrated form in accordance with the present invention and by the use of cation-exchange materials than has been possible heretofore. Such sols may be prepared, for example, from sodium tungstate, sodium vanadate, sodium molybdate and the like.

Any suitable cation-exchange material which operates on a hydrogen regenerating cycle and is substantially stable to dilute alkaline and acid solutions may be employed in the practice of the present invention. Many types of inorganic, organic and synthetic type cation-exchange materials are available for use in carrying out the process described herein. As examples of those which are particularly suitable are the so-called synthetic types such as phenol-formaldehyde resins, tannin-formaldehyde resins and the like or derivatives thereof containing sulfonic or carboxylic groups, or modified organic types such as brown coal, peat and the like which have been sulfonated with concentrated sulfuric acid. Another particularly valuable cation-exchange material which is especially suitable for use in the practice of the present invention is polymerized divinyl benzene containing nuclear sulfonic acid groups. Such cation-exchange materials can be employed for a large number of cycles without substantial loss of bed dimensions by simple regeneration with dilute mineral acids such as hydrochloric acid, sulfuric acid and the like.

The regeneration of cation-exchange materials which have been exhausted by the adsorption of cations can be accomplished by well-known procedures heretofore described in the prior art. One such procedure is to first back wash the exhausted bed with water so as to remove a large portion of the silica aquasol adhering to the bed. This is then followed by a regeneration treatment with a dilute mineral acid after which, a substantial portion of the acid is washed out of the bed by back washing the bed with water. This procedure is only illustrative of those employed in regenerating cation-exchange materials and other procedures may be used if desired. The regeneration of the exchange bed may be carried out at any stage of the method herein described for the preparation of silica aquasols. In general, the regeneration of the exchange bed is started as soon as the total effluent from the bed has been collected. When the regeneration of the bed is carried out expeditiously, it is possible to use the same exchange bed in the recycling process since regeneration can be effected while the silica aquasol effluent from the previous run is being heat treated.

A further understanding of the present invention will be obtained from the following examples which are intended to be illustrative, but not limitative of the scope of the invention, parts and percentages being by weight unless otherwise specified.

Example I

A concentrated silica aquasol was prepared by first allowing an aqueous sodium silicate solution (3.1 to 1 ratio of $SiO_2$) containing about 3% ionic $SiO_2$ to flow by gravity through a 12 inch deep bed of acid regenerated cation-exchange material contained in a cylindrical glass tube having an internal diameter of approximately 1⅞ inches. The rate of flow was about 300 parts of solution per minute. The silicate solution was allowed to flow through the bed until the total effluent which was collected in a suitable tank, contained about 0.03% sodium ion. This effluent was then concentrated by evaporating the water therefrom at a temperature of about 100° C. until the silica concentration was about 20% and was then heat treated in an autoclave at a temperature equivalent to a gauge steam pressure of 150 pounds per inch and for a period of 15 minutes.

Three thousand parts of the above 20% silica aquasol were admixed with 450 parts of an aqueous sodium silicate solution (3.1 to 1 ratio of $SiO_2$ to $Na_2O$) comprising about 19.3% of ionic $SiO_2$. The mixture was then allowed to flow through a cation-exchange bed 12 inches in depth contained in a cylindrical glass tube having an internal diameter of approximately 1⅞ inches. The rate of flow through the bed was about 300 parts of mixture per minute. The effluent was collected in a suitable tank until the pH of the mixture was about 6.8 as measured by a Beckman pH meter at a temperature of about 28° C. Additional quantities of the effluent from the exchange bed were allowed to flow into the tank until the sodium ion concentration of the mixture in the receiver was about 0.12%. The collection of effluent from the exchange bed was then discontinued. The collected effluent was then heated in an autoclave at a temperature equivalent to 180 pounds per inch gauge steam pressure for a period of approximately 25 minutes. The heat treated effluent can be used as a commercial silica aquasol containing about 23% colloidal silica or it may be utilized in the manner described in the following example.

Example II

The heat treated effluent as obtained in Example I was divided into two portions as follows:

| | Parts |
|---|---|
| Effluent A | 450 |
| Effluent B | 3000 |

Effluent A was cooled and stored for use as a commercial silica aquasol comprising about 23% colloidal silica. Effluent B was admixed with 450 parts of aqueous sodium silicate solution (3.1 to 1 ratio of $SiO_2$ to $Na_2O$) comprising 19.3% of ionic silica and then passed through an acid regenerated cation-exchange bed in the same manner and using the same apparatus and bed depth as described in Example I. Effluent emerging from the bed was collected until the pH of the aquasol was about 6.7, after which, the exchange bed was shut off and no more effluent was collected. Sufficient quantities of the above described sodium silicate solution were then added to the total effluent until the sodium ion concentration of the mixture was about 0.05%. Four hundred and fifty parts of the effluent were then withdrawn and the remainder was heated in an autoclave at a temperature equivalent to 120 pounds per inch of gauge steam pressure for a period of 60 minutes. This effluent, after cooling to about 30° C., was then ready to be recycled through the regenerated exchange bed after an addition thereto of more ionic silica in the manner described above.

The 450 parts of effluent which had been withdrawn prior to heat treatment was then heated in an autoclave at a temperature equivalent to 200 pounds per inch of gauge steam pressure for a period of 30 minutes and after cooling was ready for commercial use. This aquasol contained colloidal silica having a large average particle size and was particularly effective for increasing the strength of cotton yarns when applied to cotton slivers prior to spinning.

The above procedure can be repeated as often as desired and provides a continuous method of preparing silica aquasols.

*Example III*

A concentrated silica aquasol was prepared by first allowing an aqueous sodium silicate solution (3.4 to 1 ratio of $SiO_2$ to $Na_2O$) containing about 3% ionic silica to flow by gravity at the rate of 250 parts per minute through a 12 inch deep bed of acid regenerated cation-exchange material, contained in a cylindrical glass tube having an internal diameter of approximately 1⅞ inches. The silicate solution was allowed to flow through the bed until the total effluent issuing therefrom contained about 0.04% sodium ion. This effluent was then concentrated by evaporating water therefrom at a temperature of about 100° C. until the silica concentration was about 20% and was then heated in an autoclave at a temperature equivalent to a gauge steam pressure of 180 pounds per inch for 10 minutes.

Three thousand parts of the above 20% silica aquasol were admixed with 450 parts of an aqueous sodium silicate solution (3.4 to 1 ratio of $SiO_2$ to $Na_2O$) comprising 19.3% of ionic silica. This mixture was then allowed to flow through the acid regenerated exchange bed until the total effluent had a pH of about 6.8. Additional sodium silicate solution was then added to the collected effluent until the sodium ion concentration thereof was about 0.10%. The effluent was then heated in an autoclave at a temperature equivalent to 170 pounds per inch gauge steam pressure for a period of 20 minutes and was then allowed to cool.

When the above heat treated effluent is recycled in the manner described in Example II, the recycling can be carried out almost indefinitely without substantial gel formation in the exchange bed.

*Example IV*

A concentrated colloidal silica aquasol was prepared in the following manner:

A dilute aqueous sodium silicate solution (3.4 to 1 ratio of $SiO_2$ to $Na_2O$) containing about 4% ionic silica was allowed to flow by gravity at the rate of 275 parts per minute through a 12 inch deep bed of acid regenerated cation-exchange material contained in a cylindrical glass tube having an internal diameter of 1⅞ inches. The effluent was collected in a suitable tank until it contained about 0.06% sodium ion and then the collection of effluent was discontinued. This effluent was then heated in an autoclave at a temperature equivalent to a gauge steam pressure of 150 pounds per square inch for a period of 10 minutes. The heat treated effluent, which contained about 4% colloidal silica as a result of the heat treatment under alkaline conditions, was then cooled to about 30° C.

Two thousand parts of the cooled effluent as obtained above, which contained about 4% colloidal silica, were admixed with 400 parts of aqueous sodium silicate solution (3.4 to 1 ratio of $SiO_2$ to $Na_2O$) containing about 23% of ionic silica and the mixture was allowed to flow by gravity at the rate of 300 parts a minute through the bed of acid regenerated cation-exchange material. The effluent was collected in a suitable tank until it contained about 0.07% of sodium ion and it was then heated in an autoclave at a temperature equivalent to a gauge steam pressure of 100 pounds per square inch for a period of 15 minutes. The effluent was then cooled to about 30° C.

Two thousand one hundred and fifty-five parts of such cooled effluent were admixed with 425 parts of aqueous sodium silicate solution (3.4 to 1 ratio of $SiO_2$ to $Na_2O$) containing 19.3% of ionic silica and the mixture was allowed to flow by gravity at the rate of 300 parts per minute through the bed of acid regenerated cation exchange material. The effluent was collected in a suitable tank until it contained about 0.05% sodium ion and was then heated in an autoclave at a temperature equivalent to a gauge steam pressure of 100 pounds per square inch for a period of 12 minutes. The heated effluent was then cooled to a temperature of about 30° C. and contained about 8.5% colloidal silica.

By recycling the alkalized and heat treated effluent after it has been cooled together with a quantity of aqueous sodium silicate solution (3.4 to 1 ratio of $SiO_2$ to $Na_2O$), containing about 19.3% ionic silica, sufficient to provide about 3% ionic silica based on the total water present in the mixture through the bed of acid regenerated cation-exchange material in the manner described above, a 20% colloidal silica aquasol was readily obtained. Such colloidal silica aquasol can be employed in place of the 20% colloidal silica aquasol initially employed in Examples I and III, or it may be used as a commercial colloidal silica aquasol for the treatment of textile fibers prior to spinning, for coating papers and the like.

The same bed of cation-exchange material was employed for each recycle of the effluent as described in this example. The bed was regenerated after each recycling operation by first back washing the bed with large quantities of water, after which, a 4% hydrochloric acid solution was allowed to flow by gravity through the bed until the acid issuing therefrom was substantially free from sodium chloride. The bed was washed down with water until the effluent had a pH of about 5.

The cation-exchange material employed in the foregoing examples is a polymerized divinyl benzene containing nuclear substituted sulfonic acid groups. The particles in the exchange material are substantially spherical and have an average diameter varying between about 0.5 to 1.5 mm.

Although an autoclave is employed in carrying out the heat treatment of the alkalized silica aquasol effluent in the foregoing examples other types of apparatus capable of withstanding steam pressures above 100° C. may be employed. Thus heat exchangers, tubular heating devices and other apparatus capable of withstanding the pressures generated may be used.

Various modifications may be made in the practice of the present invention as will be apparent to those skilled in the art. Various types of apparatus, for example, may be employed in carrying out the method described herein depending upon the quantity of silica aquasol produced and other factors. Heat exchangers may be employed to utilize the heat values more efficiently and heat retention units may be employed to carry out the heat treatment of the silica aquasols after the desired temperature has been reached. The area and depth of the exchange bed and the number of exchange beds employed may also be varied considerably depending upon the amount of silica aquasol produced and the conditions of operation.

It is intended that such modifications and other variations in the practice of the present invention be included in the scope of the present invention and that the invention be only limited by the scope of the appended claims.

What is claimed is:

1. A method of preparing inorganic oxide aquasols which comprises passing a mixture of a colloidal inorganic oxide alkaline aquasol and a small proportion of a solution of the same inorganic oxide which is present in the mixture in ionic form through a bed of cation-exchange material until the pH of the total effluent is slightly below the neutral point; alkalizing said effluent with an alkaline compound capable of yielding ions selected from the group consisting of alkali metal, ammonium and quaternary ammonium ions; heating the effluent at a temperature and for a duration of time sufficient to convert the ionic form of the inorganic oxide to colloidal form and then recycling a portion of the effluent together with a small proportion of a solution of the same inorganic oxide in ionic form through a bed of acid regenerated cation-exchange material in substantially the same manner.

2. A method of preparing silica aquasols which comprises passing a mixture of an alkaline reacting colloidal silica aquasol and a small proportion of a solution of ionic silica through a bed of cation-exchange material until the pH of the total effluent is slightly below the neutral point; alkalizing said effluent with an alkaline compound capable of yielding ions selected from the group consisting of alkali metal, ammonium and quaternary ammonium ions; heating the effluent at a temperature and for a duration of time sufficient to convert the ionic silica to colloidal form and then recycling a portion of said effluent together with a small proportion of a solution of ionic silica through a bed of acid regenerated cation-exchange material in substantially the same manner.

3. A method of preparing silica aquasols which comprises passing a mixture of an alkaline reacting colloidal silica aquasol and a small proportion of a solution of ionic silica through a bed of cation-exchange material until the pH of the total effluent is slightly below the neutral point; alkalizing said effluent with an alkaline compound capable of yielding ions selected from the group consisting of alkali metal, ammonium and quaternary ammonium ions; heating the effluent at a temperature essentially above 100° C. and for a duration of time sufficient to convert the ionic silica to colloidal form; regenerating said bed of cation-exchange material after said effluent is removed therefrom and then recycling a portion of the effluent together with a small portion of a solution of ionic silica through the bed of regenerated cation-exchange material in substantially the same manner.

4. A method of preparing silica aquasols which comprises passing a mixture of an alkaline reacting colloidal silica aquasol and a quantity of aqueous sodium silicate solution in an amount sufficient to provide up to about 4% by weight of ionic silica based on the water present in the mixture through a bed of cation-exchange material until the pH of the total effluent is slightly below the neutral point; adding thereto an amount of alkaline compound sufficient to provide at least 0.05% by weight based on the total effluent of ions selected from the group consisting of alkali metal, ammonium and quaternary ammonium ions; heating the effluent at a temperature equivalent to a gauge steam pressure of about 60 to 200 pounds per square inch and for a period of time sufficient to convert the ionic silica therein to the colloidal form and then recycling a portion of said effluent together with a quantity of aqueous sodium silicate solution sufficient to provide up to about 4% by weight of ionic silica based on the water present in the recycle mixture through a bed of acid regenerated cation-exchange material in substantially the same manner.

5. A method of preparing silica aquasols which comprises passing a mixture of an alkaline reacting colloidal silica aquasol and a quantity of aqueous sodium silicate solution in an amount sufficient to provide up to about 3% by weight of ionic silica based on the water present in the mixture through a bed of cation-exchange material until the pH of the total effluent is slightly below the neutral point; adding thereto a quantity of a sodium base sufficient to provide from about 0.05 to 0.2% by weight of sodium ions based on the total effluent; heating the effluent at a temperature equivalent to a gauge steam pressure of 60 to 200 pounds per square inch for a period of time sufficient to convert the ionic silica therein to the colloidal form and then recycling a major portion of the effluent together with a quantity of aqueous sodium silicate solution sufficient to provide up to about 3% ionic silica through a bed of acid regenerated cation-exchange material in substantially the same manner.

6. A method substantially according to claim 5 but further characterized in that the mixture of silica aquasol and aqueous sodium silicate solution is passed through the bed of cation-exchange material until the total effluent comprises about 0.05 to 0.2% by weight of sodium ions.

7. A method of preparing concentrated silica aquasols which comprises passing a mixture of an alkaline reacting silica aquasol comprising about 10 to 25% by weight of colloidal silica and a quantity of aqueous sodium silicate solution sufficient to provide up to 3% by weight of ionic silica based on the water present in the mixture through a bed of cation-exchange material until the pH of the total effluent is slightly below the neutral point; adding thereto a quantity of sodium base sufficient to provide about 0.05 to 0.2% sodium ions based on the total effluent; heating said effluent at a temperature equivalent to a gauge steam pressure of about 60 to 200 pounds per square inch for a period of 10 to 120 minutes and then recycling the total effluent minus a portion thereof substantially equal in weight to the quantity of aqueous sodium silicate solution employed together with a quantity of aqueous sodium silicate solution sufficient to provide up to 3% by weight of ionic silica based on the water present in the mixture through a bed of acid regenerated cation-exchange material in substantially the same manner.

8. A method of preparing concentrated silica aquasols which comprises passing a mixture of an alkaline reacting silica aquasol comprising about 10 to 25% by weight of colloidal silica and a quantity of aqueous sodium silicate solution sufficient to provide up to 3% by weight of ionic silica based on the water present in the mixture through a bed of cation-exchange material until the pH of the total effluent is slightly below the neutral point; alkalizing said effluent with a quantity of ammonium base sufficient to provide about 0.05 to 0.2% ammonium ions based on the total effluent; heating said effluent at a temperature equivalent to a gauge steam pressure of about 60 to 200 pounds per square inch for a period of about 10 to 120 minutes and then recycling the total effluent minus a portion thereof substantially equal in weight to the quantity of aqueous sodium silicate employed, together with a quantity of aqueous sodium silicate solution sufficient to provide up to 3% by weight of ionic silica based on the water present in the mixture through a bed of acid regenerated cation-exchange material in substantially the same manner.

9. A method of preparing concentrated silica aquasols which comprises passing a mixture of an alkaline reacting silica aquasol comprising about 10 to 25% by weight of colloidal silica and a quantity of aqueous sodium silicate solution sufficient to provide up to 3% by weight of ionic silica based on the water present in the mixture through a bed of cation-exchange material until the pH of the total effluent is slightly below the neutral point; alkalizing said effluent with a quantity of quaternary ammonium base sufficient to provide about 0.05 to 0.2% quaternary ammonium ions based on the total effluent; heating said effluent at a temperature equivalent to a gauge steam pressure of about 60 to 100 pounds per square inch for a period of 10 to 120 minutes and then recycling the total effluent minus a portion thereof substantially equal in weight to the quantity of aqueous sodium silicate employed, together with a quantity of aqueous sodium silicate solution sufficient to provide up to 3% by weight of ionic silica based on the water present in the mixture through a bed of acid regenerated cation-exchange material in substantially the same manner.

10. A method of preparing silica aquasols which comprises passing a mixture of an alkaline reacting colloidal silica aquasol and a quantity of aqueous sodium silicate solution in an amount sufficient to provide up to about 4% by weight of ionic silica based on the water present in the mixture through a bed of cation-exchange material until the pH of the total effluent is slightly below the neutral point; adding thereto an amount of sodium base sufficient to provide at least 0.05% by weight based on the total effluent of sodium ions; heating the effluent at a temperature equivalent to a gauge steam pressure of about 60 to 200 pounds per square inch and for a period of time sufficient to convert the ionic silica therein to the colloidal form without the formation of extremely large colloidal silica particles which tend to form a floc in said bed of cation-exchange material and then recycling a portion of said effluent together with a quantity of aqueous sodium silicate solution sufficient to provide up to about 4% by weight of ionic silica based on the water present in the recycle mixture through a bed of acid regenerated cation-exchange material in substantially the same manner.

HENRY S. TRAIL.

REFERENCES CITED

The following references are of record in the file of this patent:

UNITED STATES PATENTS

| Number | Name | Date |
|---|---|---|
| 2,386,247 | Marshall | Oct. 9, 1945 |
| 2,386,337 | Moyer | Oct. 9, 1945 |
| 2,411,820 | Ashley | Nov. 26, 1946 |
| 2,431,481 | Hurd et al. | Nov. 25, 1947 |

FOREIGN PATENTS

| Number | Country | Date |
|---|---|---|
| 102,686 | Switzerland | Dec. 17, 1923 |